Nov. 1, 1932.  S. MARELLA  1,885,849
TRAVELING CASE
Filed Aug. 12, 1930   2 Sheets-Sheet 1
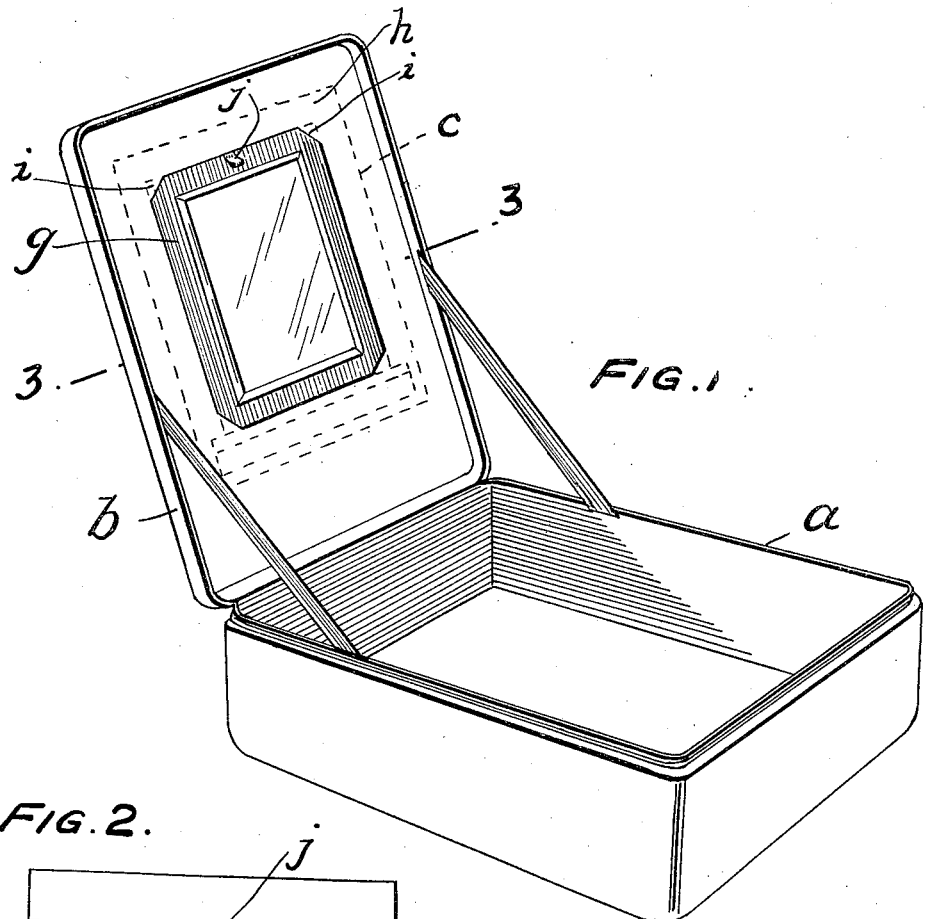
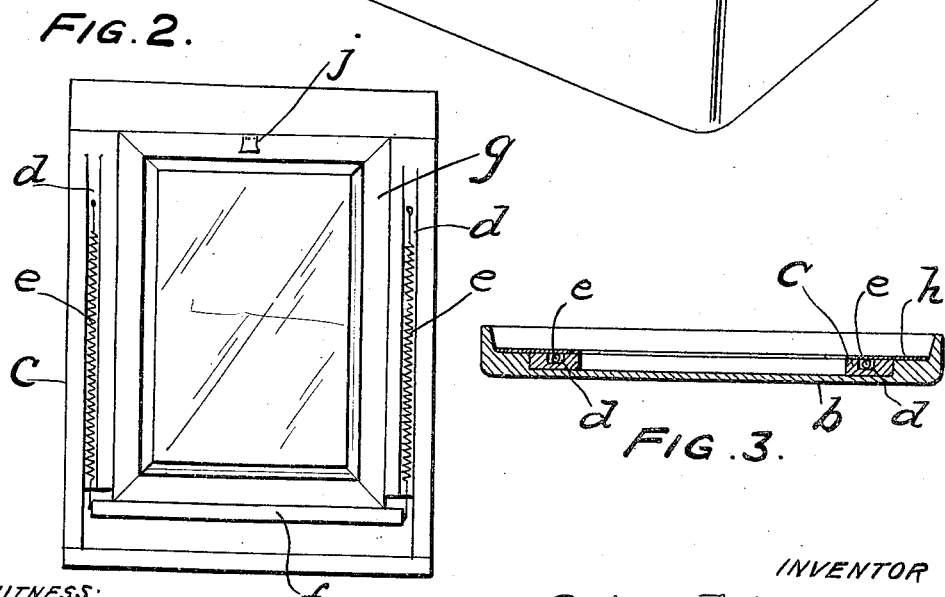
INVENTOR
Silvio Marella
BY
Busser and Harding
ATTORNEYS.

Nov. 1, 1932. S. MARELLA 1,885,849
TRAVELING CASE
Filed Aug. 12, 1930   2 Sheets-Sheet 2

WITNESS:
Rob R Kitchel

INVENTOR
Silvio Marella
BY
Busser and Harding
ATTORNEYS.

Patented Nov. 1, 1932

1,885,849

UNITED STATES PATENT OFFICE

SILVIO MARELLA, OF PHILADELPHIA, PENNSYLVANIA, ASSIGNOR TO THE F. H. WHITE COMPANY, OF PHILADELPHIA, PENNSYLVANIA, A CORPORATION OF PENNSYLVANIA

TRAVELING CASE

Application filed August 12, 1930. Serial No. 474,747.

The object of the invention is to provide a traveling case adapted to securely hold a mirror in exposed position and which is also readily removable and replaceable. A further object of the invention is to provide a traveling case provided with a compartment adapted to removably and replaceably hold a mirror and toilet articles, the mirror frame functioning as a closure for the box and preferably carrying the toilet articles.

The drawings illustrate two embodiments of the invention.

Figs. 1, 2 and 3 show one embodiment of the invention. Fig. 1 is a perspective view of the traveling case. Fig. 2 is a front (or inside) view of the hinged upper compartment or cover member of the case. Fig. 3 is a transverse section through the cover member of the case.

Figure 4:
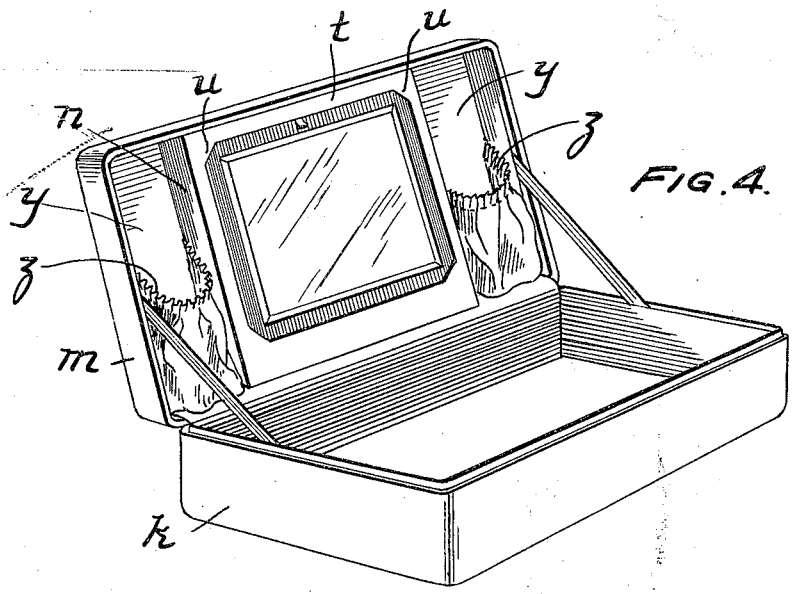
Figure 5:
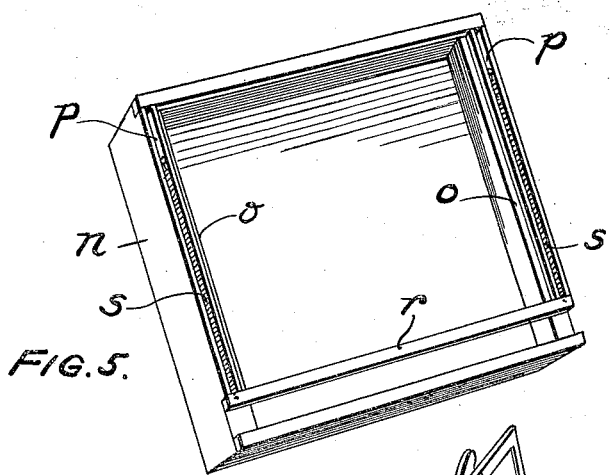
Figure 6:
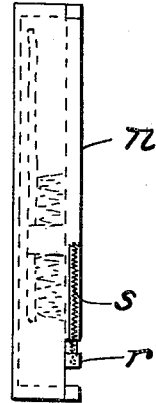
Figure 7:
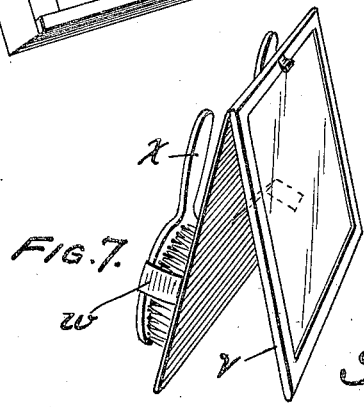

Figs. 4, 5, 6 and 7 show another embodiment of the invention. Fig. 4 is a perspective view of the case. Fig. 5 is a view of the box which holds, and is closed by, a mirror-carrying easel. Fig. 6 is an end view of the box and easel, partly broken away. Fig. 7 is a perspective view of the mirror-carrying easel.

The traveling case shown in Figs. 1, 2 and 3 comprises two hinged-together compartment members—the body $a$ and cover or lid $b$. The member $b$ is provided with a recess in which is inserted a rectangular frame $c$ enclosing an opening for the reception of a framed mirror $g$. Frame $c$ is flush with the surrounding inner wall of compartment $b$. The side members of the frame are reduced in width at their lower ends. In these side members are formed longitudinally extending grooves $d$ within which extend light tension springs $e$, secured at their upper ends in the grooves and extending at their lower ends through the open lower ends of the grooves and there secured to a cross-bar $f$ extending beneath shoulders formed above the reduced width parts of the side members of frame $c$. The springs $e$ normally hold the bar $f$ against these shoulders.

The frame of the mirror is slightly longer than the opening enclosed by frame $c$. By aligning the mirror frame with this opening, resting the lower edge of the mirror frame over cross-bar $f$, pressing down the mirror frame until the opening is enlarged to accommodate the mirror, and then pushing the upper end of the mirror frame into the upper end of the opening so that the mirror frame will be flush with frame $c$, the mirror will be held in position by the upward pressure of cross-bar $f$.

To insure the retention of mirror $g$ in frame $f$, a plate mat, or pad $h$, substantially corresponding in external dimensions with the inner wall of compartment $b$, and provided with a central opening substantially aligning with the opening enclosed by frame $c$, is applied to this inner wall and to the frame $c$. At the inner corners of plate $h$ are integral triangular ears $i$. In inserting mirror $g$, it is pushed down far enough, against the tension of the spring-pulled bar $f$, to clear the upper ears $i$. When the upper end of the mirror is then pushed into the opening in frame $c$, and released, bar $f$ will push the mirror upward until its upper edge engages the lower edge of the upper bar of frame $c$. The mirror is thus held, at the corners, as well as by bar $f$, from accidental dislodgement.

To remove the mirror frame, the tab $j$ on the upper end thereof is grasped between finger and thumb and the mirror is thereby pushed down until its upper end clears the upper ears $i$, whereupon it may be readily withdrawn.

The plate $h$ enclosing the mirror may be utilized for holding various toilet articles.

The mirror may be utilized by merely opening the case and retaining or placing it in the position shown in Fig. 1, or by removing the mirror and placing it in any convenient location.

The case shown in Figs. 4, 5, 6 and 7 is a more elaborate embodiment of the same invention and contains other features of novelty. The lower and upper hinged-together members of the case are marked respectively $k$ and $m$. In member $m$ is inserted a frame $n$ forming an open-front box of substantial depth. The side wall of the box is provided with a longitudinally extending ridge $o$ spaced from the front edge of the box. In the front wall of the box are formed grooves $p$ within which extend tension springs $s$, whose upper ends are secured in the grooves and whose lower ends are secured to a crossbar $r$ abutting against shoulders formed by cutting away the lower ends of the side walls of the box frame $n$. Applied to the front of the box is a plate, mat or pad $t$ provided with corner ears $u$.

A mirror is insertable into, and removable from, the box frame in the manner described in connection with the description of the structure of Figs. 1, 2 and 3; the mirror, when in position, resting against the ridge $o$.

In Fig. 7 the mirror is shown as carried by an easel $v$, one member of which carries a mirror while the other member carries holders $w$ adapted to carry toilet articles $x$. Thereby the mirror-carrying frame is utilized also as a container for toilet articles.

The easel $v$ is adapted to be inserted into the box frame $n$ in a reversed position, that is, with the member holding the toilet articles on the outside and the mirror-carrying member on the inside, which conveniently positions the toilet articles for use. Such utilization of the device may be preferred when it is not desired to use the mirror, or when it is desired to utilize the box for packing other articles.

The box $n$ is preferably of such smaller size than the cover member $m$ of the case as to provide end compartments $y$, $y$, within which may be secured flexible pockets $z$, $z$, for holding any articles that the pockets are adapted to accommodate.

If desired, the mirror used in the case of Fig. 4 may be a flat frame, as shown in Figs. 2 and 3, and the toilet article holders may be applied to the rear of the frame, or may be secured to the rear wall or floor of the box $n$.

What I claim and desire to protect by Letters Patent is:

1. In a traveling case, a box frame secured therein and having a front opening, a mirror frame insertable in said opening, a spring-tensioned member adapted to hold the mirror frame in said opening and movable to allow the withdrawal of the mirror frame, the mirror frame constituting a removable closure for the box.

2. In a traveling case, a box frame secured therein and enclosing an opening, an easel insertable in said opening, a spring-tensioned member adapted to hold the easel in said opening and movable to allow the withdrawal of the easel, and a mirror carried by one hinged member of the easel.

3. In a traveling case, a holding frame secured therein comprising side pieces and a movable end bar enclosing an opening, springs extending along said side pieces and secured to said end bar and tending to move said bar into position to contract said opening, and a mirror frame insertable and removable from said opening by endwise pressure against the end bar.

4. In a traveling case, a holding frame secured therein comprising side pieces and a movable end bar defining a rectangular opening, springs extending along said side pieces and secured to said end bar and tending to move said bar to contract said opening, a plate covering the holding frame and having an opening therein smaller than said rectangular opening whereby it overlaps the edges of said rectangular opening, and a mirror frame insertible into and removable from said rectangular opening by endwise pressure against the end bar and adapted to be held in the rectangular opening by said plate.

In testimony of which invention, I have hereunto set my hand, at Philadelphia, Pennsylvania, on this 11th day of August, 1930.

SILVIO MARELLA.